Jan. 17, 1956    C. A. SHERMAN ET AL    2,731,538
METAL DISINTEGRATING MACHINE
Filed Dec. 28, 1953    2 Sheets-Sheet 1

INVENTORS
Terry Merritt and
BY Clarence A. Sherman
Thos. Donnelly
ATTORNEY

Jan. 17, 1956  C. A. SHERMAN ET AL  2,731,538
METAL DISINTEGRATING MACHINE
Filed Dec. 28, 1953  2 Sheets-Sheet 2
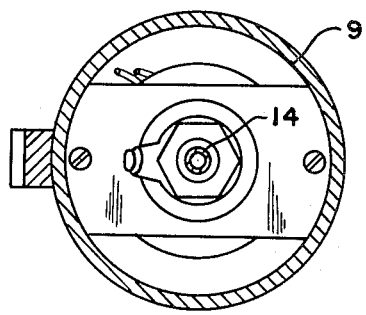
FIG. 2
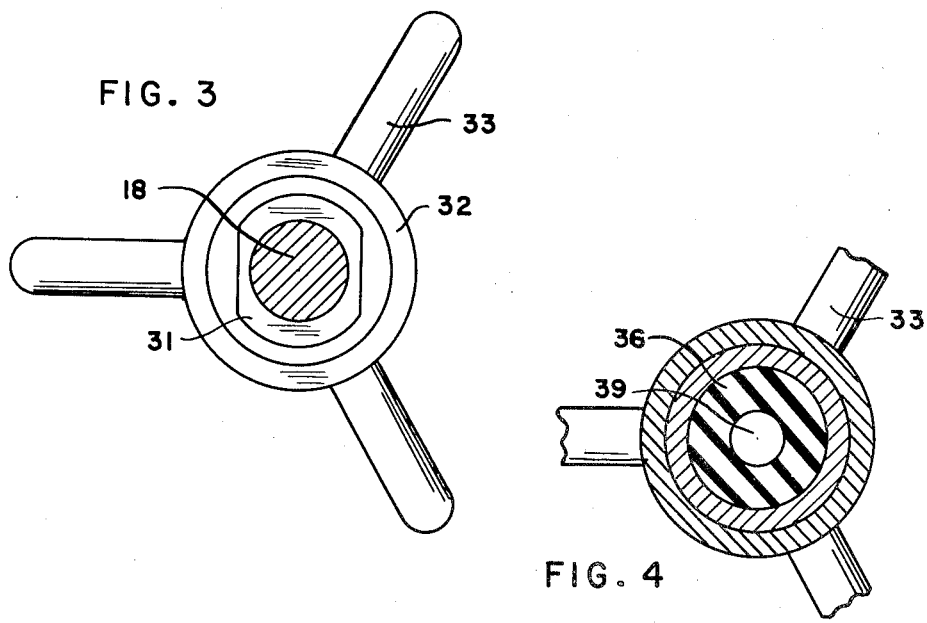
FIG. 3
FIG. 4
INVENTORS
Terry Merritt and
BY Clarence A. Sherman
Thos. S. Donnelly
ATTORNEY

United States Patent Office 2,731,538
Patented Jan. 17, 1956

2,731,538

METAL DISINTEGRATING MACHINE

Clarence A. Sherman, Detroit, and Terry Merritt, Clinton, Mich., assignors to Clinton Machine Company, Clinton, Mich.

Application December 28, 1953, Serial No. 400,707

5 Claims. (Cl. 219—15)

Our invention relates to a new and useful improvement in a metal disintegrating machine in which an electrode, which is connected in a welding circuit, is rapidly reciprocated into and out of engagement with a work piece, so as to make and break an electric arc. In the use of such machines, it is customary to use a cooling liquid which is directed against that part of the work piece operated upon. As the metal is disintegrated, it is washed out of the cavity or hole by the cooling liquid. Experience has shown that by making and breaking the arc in the presence of this flow of cooling liquid, a considerable splash is encountered, and this liquid frequently follows the electrode so as to carry into the interior of the machine small particles of the metal which has been removed. This results in an undue wear on the machine, resulting in less efficient operation.

It is an object of the present invention to provide in such a machine a means for securing the electrode on the reciprocating spindle in such a manner that the seepage of liquid around the electrode past the point of securement is prevented.

Another object of the invention is the provision of an electrode gripping member so arranged and constructed that the electrode is sealed around its periphery sufficient to prevent passage of liquid past the same, while at the same time as the sealing member is moved into sealing relation to the electrode, the electrode is automatically centered relatively to the reciprocating spindle to which the electrode is fastened.

Another object of the invention is the provision in a disintegrating machine of this class of a conduit for conducting a coolant to the electrode so arranged and constructed that this conduit serves as a spring member to retain the various parts under pressure when assembly has been made.

Other objects will appear hereinafter.

It is recognized that various modifications and changes may be made in the detail of structure illustrated without departing from the invention, and it is intended that the present disclosure shall be considered to be but the preferred embodiment.

Forming a part of this application are drawings in which,

Fig. 2 is a sectional view taken on line 2—2 of Fig. 1;

Fig. 3 is a sectional view taken on line 3—3 of Fig. 1 slightly enlarged;

Fig. 4 is a sectional view taken on line 4—4 of Fig. 1 slightly enlarged.

Figure 1:
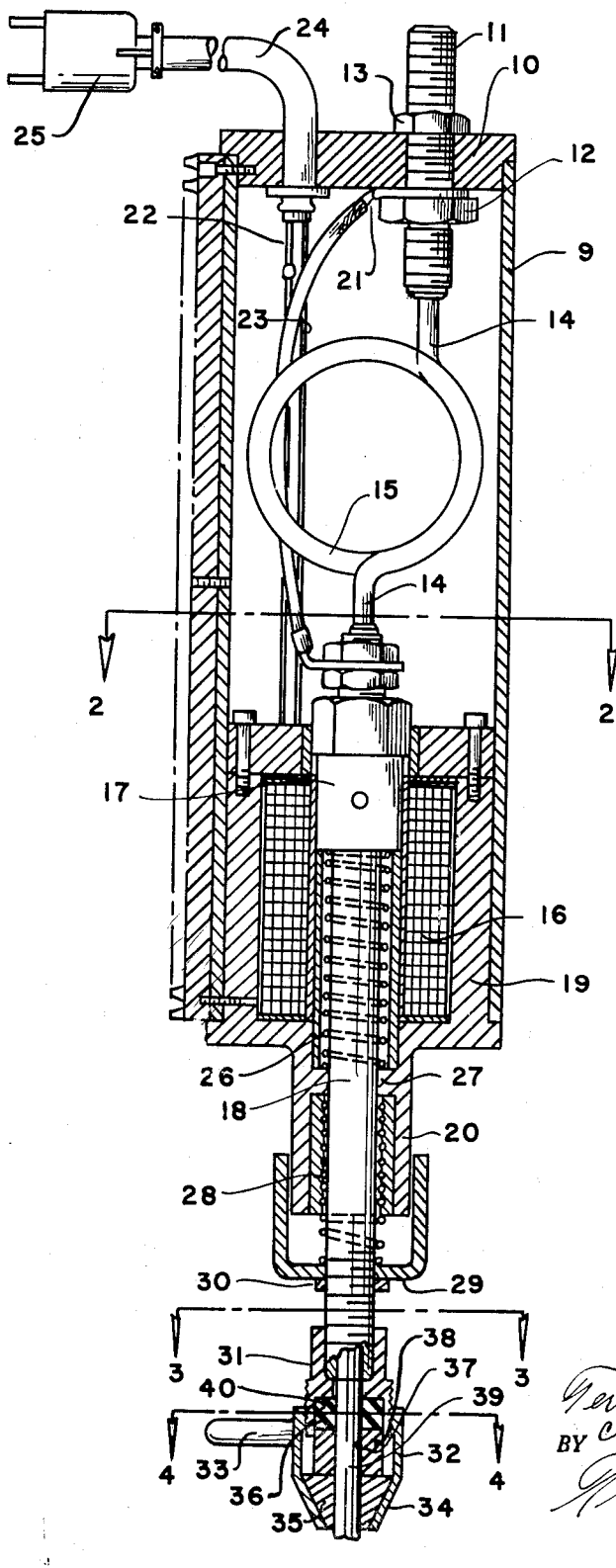
Fig. 1 is a longitudinal central sectional view illustrating the invention.

In the drawings we have illustrated a disintegrating machine embodying a housing 9 having a closure 10 at its upper end through which extends the tubular threaded stud 11 held in position by means of the nuts 12 and 13. Secured at one end of the inner end of the stud 11 in communication therewith is a tube 14 provided with a coil 15 intermediate its ends. This tube 14 is formed from metal and preferably copper, so that the coil 15 thus affords a spring structure.

Mounted in the housing 9 is a solenoid 16 slidable in which is the armature 17 which is connected to the tubular spindle 18, this tubular spindle being in connection through the armature 17 with one end of the tube 14. An enclosure 19 is positioned in the housing 9 to enclose the solenoid 16, and this enclosure is provided with the outwardly projecting neck 20. The stud 11 is connected into the welding circuit and this stud 11 is directly connected by the cable 21 to the upper end of the armature 17 so that the spindle 18 is thus connected in the welding circuit. Connecting to the windings of the solenoid are the wires 22 and 23 which lead from the cable 24 having a socket plug 25 which may be plugged into a suitable source of electrical energy. Thus the solenoid is not connected into the welding circuit, but is energized by an independent circuit.

Embracing the spindle 18 is a spring 26, one end of which bears against the end face of the armature 17, and the other end of which bears against the flange 27 in the neck 20.

Embracing the spindle 18 is a spring 28 which seats in the neck 20 and which bears at one end against the flange 27 and at the other end against the bottom of the cup 29 which is held in embracing relation to the end of the neck 20 by means of the nut 30, threaded on the spindle 18.

Fixedly mounted on the lower end of the spindle 18 is a fitting 31 on which is adapted to thread a collet sleeve 32 having the arms 33 projecting outwardly therefrom. As shown in Fig. 1, the lower end of this collet sleeve 32 is provided with a conical inner surface 34 which is adapted to engage the frustro-conical block 35. Engaging in the end of the fitting 31 is a circular block 36 of yieldable material, such as rubber or the like, having a central opening 37 formed therein. Positioned between the block 36 and the block 35 is a block 38, of metal. Inserted into the end of the spindle 18 is a tubular electrode 39 which extends through the blocks 35, 36 and 38. As the collet sleeve 32 is threaded into position, the rubber block 36 will be compressed so as to tightly grip and seal around the periphery of the electrode 39. It will be noted that the fitting 31 projects at its end beyond the outer face of the compressible block 36. The block 38 which is formed from metal snugly engages in the end of the fitting, this projecting end serving as a space into which the block 38 may be projected. As the sleeve 32 is threaded into position for compressing the block 36, the block 38 will serve to center the electrode relatively to the spindle 18.

When the block 36 is compressed, it will serve to seal against member 31 and prevent leakage of lubricant downwardly through the collet or chuck.

Due to the gripping of the compressed block 36 around the periphery of the electrode 39, a seepage upwardly around the periphery of the electrode of the coolant which has been used is prevented and thus no foreign material can be carried into the mechanism positioned above.

In the use of machines of this type, it is customary to use various size electrodes depending upon the nature of the work to be performed. The hole formed through the block 36 and the block 38 is of a size to snugly receive an electrode, and when it is desired to use a different size electrode, these blocks may be replaced with others having a different size opening formed therethrough but of the same outside diameter.

When assembled, the coil 15 is under tension so that the parts are prevented from rattling or becoming unduly loose. This is important because in operation the spindle 18 is rapidly reciprocated in one direction by the solenoid against the compression of the springs 26 and 28, and this spindle is moved in the other direction, upon de-energizing of the solenoid, the moving in the other direction being in response to spring pressure.

Experience has shown that with a structure of this type, a highly efficient mechanism is provided for the purposes intended, and the objectionable features hereinabove referred to have been avoided.

What we claim is:

1. In a metal disintegrating machine having a reciprocating hollow spindle, a fitting having the upper end thereof secured to the end of said spindle in embracing relation, and having the lower end thereof projecting outwardly from the spindle, there being an opening formed through said fitting in alignment with the bore of the spindle and said lower projecting end of said fitting being hollow; an inwardly projected flange between the upper and lower ends of said fitting, said flange engaging the end of the spindle; a block of compressible material positioned in said lower projecting end of said fitting and abutting said flange and having a central opening formed therethrough in alignment with the bore of said spindle for projection of an electrode therethrough into said spindle, the outer face of said block being positioned inwardly of the lower end face of said fitting; a block of rigid material engaging at one end in the lower projecting end of said fitting and having a central opening formed therethrough in alignment with the opening in said compressible block; and a collet threaded on the lower end of said fitting for delivering a thrust to said rigid block for compressing said compressible block around an electrode projected therethrough and into sealing engagement with the inner surface of said fitting.

2. In a metal disintegrating machine having a hollow reciprocating spindle, a fitting secured to the end of said spindle and being provided with a lower portion projecting outwardly therefrom and having a passage therethrough in alignment with the bore of the spindle, the portion of said fitting projecting outwardly beyond the end of said spindle being hollow; a block of compressible material positioned in the projecting end of said fitting and having a central opening formed therethrough in alignment with the passage in said spindle; an inwardly directed flange in said fitting having one side thereof in abutment with the end of the spindle and the other side thereof in abutment with said block of compressible material, said fitting projecting at its end beyond the outer face of said block; a rigid block engaging in the end of said fitting and projecting outwardly beyond the end of the same and in engagement with said compressible block and having an opening formed therethrough in alignment with the passage in said spindle and snugly engaging at its periphery the inner surface of said projecting end of said fitting; and a collet secured to said fitting for delivering a thrust to said rigid block for compressing said compressible block against the periphery of an electrode projected therethrough and extended beyond the end of said collet, and for compressing the periphery of said compressible block into sealing engagement with the inner surface of said fitting.

3. In a metal disintegrating machine having a hollow reciprocating spindle, a fitting secured to the end of said spindle and being provided with a lower portion projecting outwardly therefrom and having a passage therethrough in alignment with the bore of the spindle, the portion of said fitting projecting outwardly beyond the end of said spindle being hollow; a block of compressible material positioned in the projecting end of said fitting and having a central opening formed therethrough in alignment with the passage in said spindle; an inwardly directed flange in said fitting having one side thereof in abutment with the end of the spindle and the other side thereof in abutment with said block of compressible material, said fitting projecting at its end beyond the outer face of said block; a rigid block engaging in the end of said fitting and projecting outwardly beyond the end of the same and in engagement with said compressible block and having an opening formed therethrough in alignment with the passage in said spindle and snugly engaging at its periphery the inner surface of said projecting end of said fitting; a collet secured to said fitting for delivering a thrust to said rigid block for compressing said compressible block against the periphery of an electrode projected therethrough and extended beyond the end of said collet, and for compressing the periphery of said compressible block into sealing engagement with the inner surface of said fitting; and a second block of compressible material positioned in the lower end of said collet and abutting said rigid block.

4. In a metal disintegrating machine having a reciprocating hollow spindle, a fitting having upper and lower hollow portions separated by a wall, said spindle being fixedly mounted in the hollow upper end of said fitting and abutting said wall, there being an opening formed through said wall in alignment with the bore of the spindle; a block of compressible material positioned in the lower hollow portion of said fitting and abutting said wall and having a central opening formed therethrough in alignment with the bore of said spindle for projection of an electrode therethrough into said spindle, the outer face of said block being positioned inwardly of the lower end face of said fitting; a block of rigid material engaging at one end in the lower end of said fitting and having a central opening formed therethrough in alignment with the opening in said compressible block; and a collet threaded on the lower end of said fitting for delivering a thrust to said rigid block for compressing said compressible block around an electrode projected therethrough and into sealing engagement with the inner surface of said fitting.

5. In a metal disintegrating machine of the class described having a hollow reciprocating spindle, a housing for enclosing the same, the lower end of said spindle projecting outwardly from the lower end of said housing; an electromagnetic winding in the lower end of said housing and surrounding said spindle; an armature on the upper end of said spindle for movement by said winding; a closure for the upper end of said housing; and a flexible resilient tubular member connected to said closure and to the upper end of said spindle for conducting coolant fluid to said hollow spindle, said tubular member being under compression upon movement of said closure into closing position in said housing whereby said member serves as a spring member to retain the spindle under a downwardly directed pressure.

References Cited in the file of this patent

UNITED STATES PATENTS

| | | |
|---|---|---|
| 975,905 | Taylor | Nov. 15, 1910 |
| 1,804,581 | Wigle | May 12, 1931 |
| 2,383,382 | Harding | Aug. 21, 1945 |
| 2,383,383 | Harding | Aug. 21, 1945 |
| 2,416,278 | Austin et al. | Feb. 25, 1947 |
| 2,549,360 | Barbeck | Apr. 17, 1951 |